C. Scales.
Construction of Ships.
N° 7,846. Patented Dec. 17, 1850.
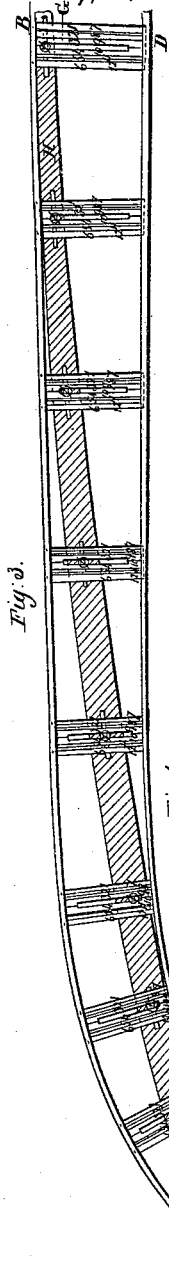
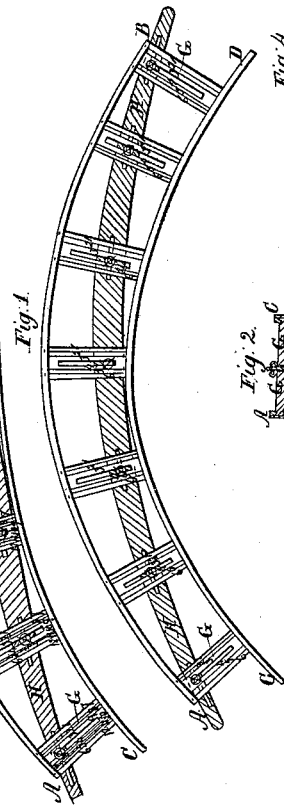
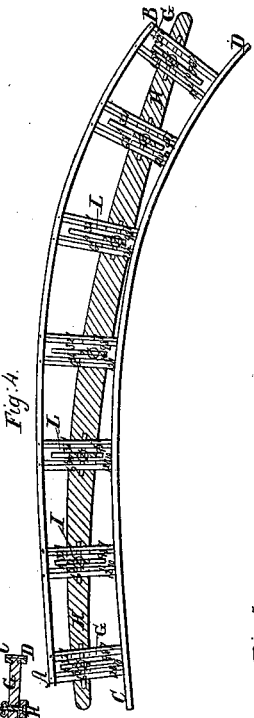
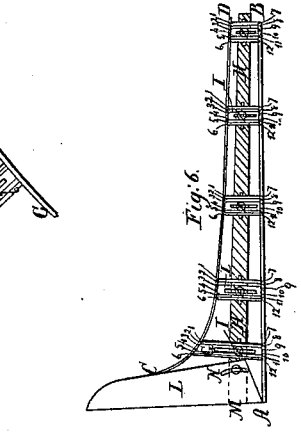
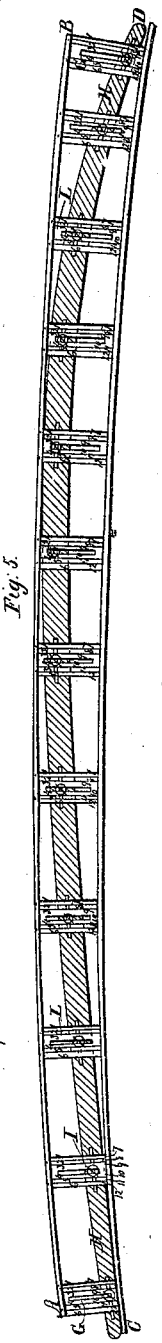

UNITED STATES PATENT OFFICE.

CHARLES SCALES, OF BATH, MAINE.

INSTRUMENT FOR LAYING DOWN CURVES OF SHIPS' TIMBERS.

Specification of Letters Patent No. 7,846, dated December 17, 1850.

*To all whom it may concern:*

Be it known that I, CHARLES SCALES, of Bath, in the county of Lincoln and State of Maine, have invented a new and useful Improvement in Instruments for Marking Out the Curves of Ship-Timbers, of which the following is a full, clear, and exact description, reference being had to the accompanying drawings, which form part of this specification, and in which—

Figures I, III, IV, V, and VI, represent side elevations of several of my adjustable molds, and Fig. II is a transverse section of one of them.

In order to cut ships' timbers to the proper shape it is customary to cut a mold or templet of thin boards to the exact shape of the timber to be hewed, one such mold is required for at least each alternate timber of the frame, and the time, labor and materials expended in preparing them constitutes an important item in the cost of the vessel.

The object of my improvement is to furnish an adjustable mold whose curvature can be adjusted at will to conform to the shapes of a number of the timbers so that after it has been used to mark one timber of a particular shape its curvature may be adjusted to mark others of different shape by which means the time and labor of cutting out separate molds for each timber is saved, while as one of my adjustable molds will answer for many timbers of different shapes a great saving is effected in the quantity of lumber required.

My adjustable mold may also be employed in marking out the timbers of vessels of different model and size whereas the ordinary molds can be employed only for vessels of exactly the same form and dimensions.

My instrument consists of an outer flexible rib by means of which the outside curve of the timber is marked down; of a similar inner rib by means of which the inside curve of the same timber is marked, of a series of crossties by which the two ribs are connected, and of a clamp bar and clamp screws by means of which the mold is fixed in any required shape.

In the accompanying drawing A, B, is the outer rib; it is constructed of some tough wood which can be bent without cracking to any curvature required in laying down the shape of the timbers which the instrument is constructed to mold. C D is the inner rib constructed in the same manner. The outer rib has a dove-tailed groove cut in its inner side in which the outer extremities of the crossties G are secured while their opposite extremities are fitted to slide in a similar dove tailed groove formed in the inner side of the inner rib C D. Each crosstie (G) is perforated with a slot. An inflexible clamp bar H is fitted to the faces of the cross-ties, this bar is perforated with a series of slots which are at right angles or nearly so with those in the crossties. Each slot in the cross-ties is furnished with a bolt which being passed through the corresponding slot in the clamp bar is fitted with a clamp nut by tightening which the crossties are clamped to the bar in whatever position they may be placed. From the above description and the annexed drawing it is evident that when the clamp nuts are slacked the mold may be bent until the extremities of the outer rib strike those of the clamp bar, and that as the two ribs are connected by crossties which are made fast to the outer rib, these must always be ot right angles with the curve of this rib at the point at which they are attached; consequently the inner rib will preserve its relative distance from the outer rib in whatever curve it may be bent. As the outside and inside curves of the timbers are marked out by the outer and inner ribs, it is evident that the length of the crossties, which determine the relative positions of the ribs, must determine the thickness of the timber, and therefore if the timber is to be cut tapering as with knees, these crossties must be constructed progressively shorter as shown at Fig. VI. In order to enable any mold to serve for a large number of curves, each may be fitted with a set of clamp bars of varying curvature.

In constructing a vessel it is convenient to have several of these molds as for example one (Fig. III) for the first futtock timbers, one (Fig. I) for the second futtocks, one (Fig. IV) for the third futtocks, one (Fig. V) for the deck timbers, and one or more (Fig. VI) for the knees. When any one of these is to be used it is laid down upon the floor or other surface on which the curves of the ship timbers have been drawn in the usual manner, and the clamp screws being slacked, the outer rib is bent to the curve of the timber to be cut, by which operation the inner rib will be correspondingly bent to the inner curve of the same timber, the points where the edge of the clamp bar crosses each cross bar are then marked with a pencil and are all numbered with the number of the timber to be hewed, so that in case of any derangement of the instrument it can be reset by these marks to its proper curve. If now the clamp screws be all tightened the instrument will be fixed in the shape to which it has been bent, and if laid upon the timber to be hewed will answer exactly the same purpose as the templets generally used to mark out the shape of the timber by drawing a marking awl or pencil successively along its two ribs. Where one timber has been thus laid out the instrument may be set to mark out the shape of other timbers in the same manner and hence by its employment the time and labor required in making separate templets as well as the material required therefor are saved.

Another method of proceeding and that which will generally be found most convenient is to lay the adjustable mold upon the draft floor, set it to the form of a timber and mark upon the cross bars the line in which the edge of the clamp bar crosses them, which marks should be numbered with the number of the timber in the frame so that the mold may be set to the same curvature without again applying it to the draft floor. The clamp screws may then be slacked and the mold may be set to the form of another timber, and the line where the clamp bar crosses the cross bars be similarly marked and numbered. This process may be continued for a series of timbers the form of which can afterward be reproduced without again referring to the draft board by resetting the clamp bar at the same marks.

What I claim as my invention and desire to secure by Letters Patent is—

The adjustable mold constructed substantially as herein set forth so that it can be set to the outside and inside curves of the timbers of a vessel and can then be used to mark them upon the wood of which they are to be formed.

CHARLES SCALES. [L. S.]

Signed and sealed in presence of—
CHARLES R. PORTER,
JACOB SMITH.